(12) United States Patent
Feick

(10) Patent No.: US 7,506,878 B2
(45) Date of Patent: Mar. 24, 2009

(54) SELF-LEVELING TIRE

(76) Inventor: William Kurt Feick, 90 Lambert Rd., New Canaan, CT (US) 06840

( * ) Notice: Subject to any disclaimer, the term of this patent is extended or adjusted under 35 U.S.C. 154(b) by 284 days.

(21) Appl. No.: 11/429,723

(22) Filed: May 8, 2006

(65) Prior Publication Data

US 2007/0267830 A1  Nov. 22, 2007

(51) Int. Cl.
  *B31B 1/00* (2006.01)
(52) U.S. Cl. .......... 280/47.31; 301/5.1; 301/7; 280/78
(58) Field of Classification Search .......... 280/659, 280/47.31, 47.131, 47.17, 651, 652, 653, 280/654, 78; 152/246, 323, 209.15; 301/5.7, 301/5.301, 5.303, 5.1, 7
See application file for complete search history.

(56) References Cited

U.S. PATENT DOCUMENTS

| | | | | |
|---|---|---|---|---|
| 2,422,331 A | * | 6/1947 | Bates ........................... 280/42 |
| 3,205,928 A | * | 9/1965 | Fishman ..................... 152/166 |
| 3,552,760 A | * | 1/1971 | Sine ............................ 280/653 |
| 4,033,395 A | | 7/1977 | Berg et al. .................. 152/323 |
| 4,190,260 A | | 2/1980 | Pearce ..................... 280/47.31 |
| 4,493,355 A | | 1/1985 | Ippen et al. ................. 152/329 |
| 4,514,243 A | | 4/1985 | Moore, III et al. .......... 156/113 |
| 5,090,464 A | | 2/1992 | Kauzlarich et al. .......... 152/310 |
| 5,251,965 A | * | 10/1993 | Johnson ................. 301/64.303 |
| 5,591,278 A | * | 1/1997 | Marcu ..................... 152/152.1 |
| 5,884,924 A | * | 3/1999 | Fairchild et al. ......... 280/47.31 |
| 6,681,822 B2 | | 1/2004 | Adams et al. .................. 152/7 |
| 7,231,948 B2 | * | 6/2007 | Forney et al. ............... 152/310 |

* cited by examiner

*Primary Examiner*—Christopher P Ellis
*Assistant Examiner*—Brian Swenson
(74) *Attorney, Agent, or Firm*—St. Onge Steward Johnston & Reens LLC

(57) ABSTRACT

A wheelbarrow that incorporates a stand coupled to a tub, a handle at the distal end of the wheelbarrow, and a wheel mount at the proximal end of the wheelbarrow. A wheel is rotatably coupled to the wheel mount and comprises a rim surrounded by a non-pneumatic tire. The tire has a mounting region and an expanded region. The axial width of the expanded region is substantially greater than the axial width of the mounting region and the tire has a relatively flat tread surface.

19 Claims, 3 Drawing Sheets

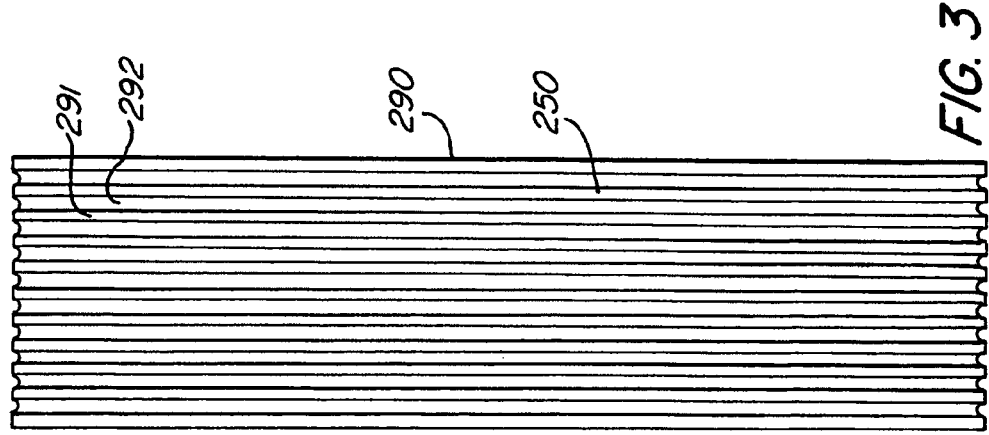
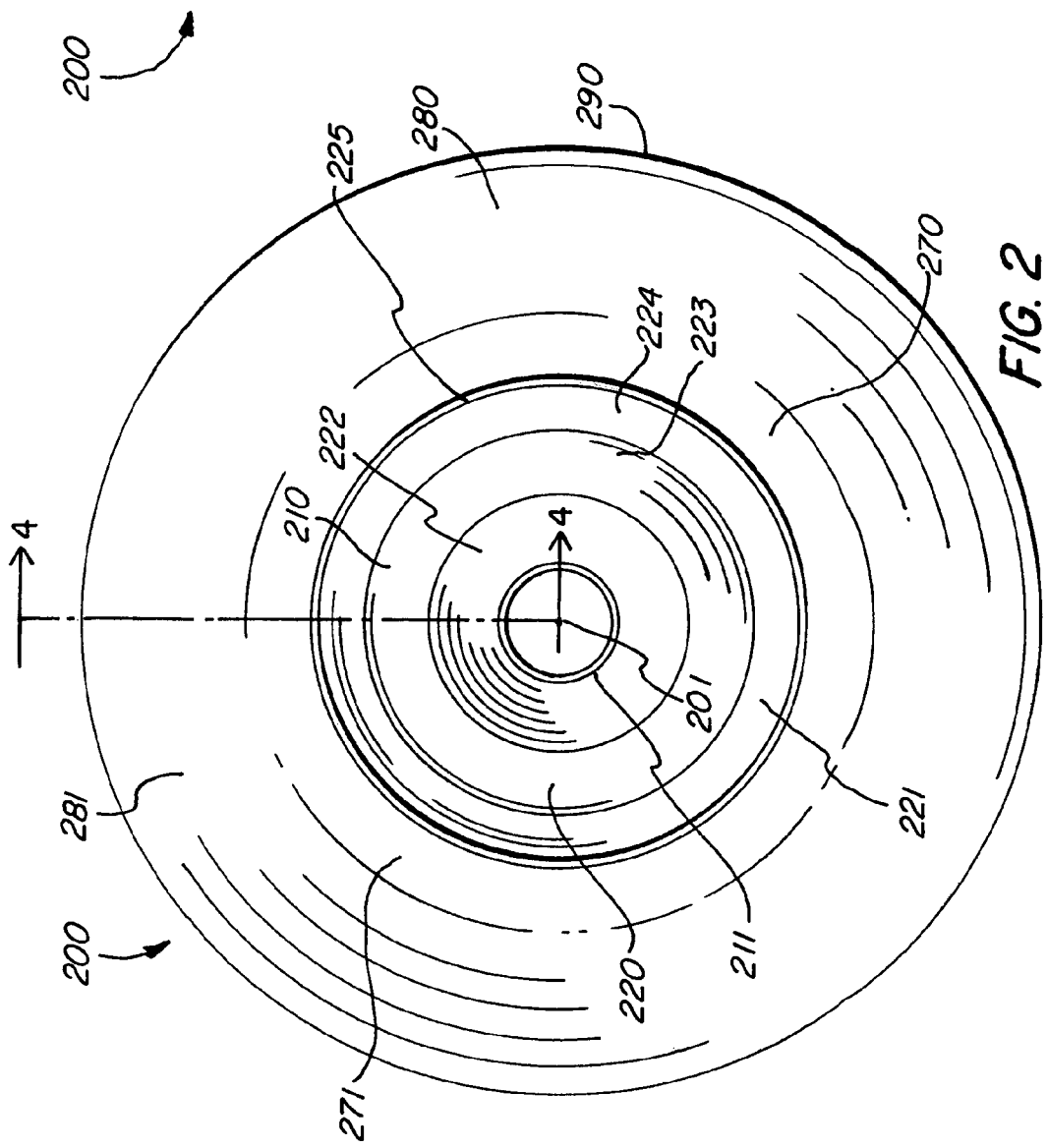

SELF-LEVELING TIRE

FIELD OF THE INVENTION

The present invention relates to wheelbarrows, and, more particularly, to wheelbarrows that utilize a non-pneumatic tire with an expanded region and a ribbed flat tread surface.

BACKGROUND OF THE INVENTION

Tires are used in a wide variety of applications. The configuration of a tire will depend on the conditions of its use. The function of a wheelbarrow tire is to facilitate the movement of the wheelbarrow so that it can transfer loads from one location to another. This requires the tire to support light and heavy loads, maintain the center of balance of the wheelbarrow, and transfer loads over various soil conditions, such as sand, mud, or loose soil.

The most common wheelbarrow tire is a pneumatic tire. A pneumatic tire provides a benefit of reducing the weight and cost of the tire by reducing the rubber material utilized in the tire. However, a pneumatic tire is not entirely adequate for a wheelbarrow utilized in a rugged work environment. First, the pneumatic tire can be subject to deflation due to a puncture. Second, pneumatic tires typically have a curved profile. The benefit of a curved profile is that it minimizes the drag associated with the tire when engaging the ground. The deficiency is that the amount of flattened tread surface that engages the ground will depend on weight of the wheelbarrow and the load in the wheelbarrow tub. Varying the active tread surface means that the tire will have a varying ability to maintain the center of balance of the wheelbarrow. Third, if there is an awkward load in the wheelbarrow, i.e. not evenly balanced within the tub, the pneumatic tire may preferentially deform towards the weighted side. Further, the pneumatic tire may not be able to provide a sufficient tread surface to balance the wheelbarrow. Fourth, pneumatic tires utilize rims that are substantially the same width as the tire. This is to insure that there is an adequate rim surface area to support the tire. If the rim is not large enough to support the tire, the tire could bulge past the rim when under weight. As a result, the rim would be applying a focused pressure on the tire reducing the integrity of the tire.

To address some of the deficiencies of a pneumatic tire, polyurethane flat-free tires have been developed. These tires incorporate solid polyurethane which makes the tire puncture resistant. Utilizing solid polyurethane means that these tires are substantially heavier than pneumatic tires. And like the pneumatic tire, they utilize a rim with a width that is substantially equal to the width of the tire. These tires also incorporate tread surfaces with arced transition like pneumatic tires. Due to the weight of polyurethane tires they are not used on sandy soils and other unstable surfaces. The weight of these tires causes the wheelbarrow to sink in the sand and make them harder to push. Hence, most contractors in these sandy soil regions have shied away from molded solid tires and prefer pneumatic tires that tend to pancake out under loads providing less sinking. However, using a pneumatic tire means that the operator no longer has the benefit of using a resilient tire.

What is needed is a wheelbarrow with a tire that utilizes the benefits of a non-pneumatic tire yet at the same time reduces the weight of the tire. It would also be beneficial if the tire could incorporate a wide tread surface area that would assist in the stability of the wheelbarrow. Further, it would be beneficial if tread surface of the tire assisted in the stability of the wheelbarrow by preventing it from shifting laterally.

SUMMARY OF THE INVENTION

These and other objects are achieved by providing a wheelbarrow with a stand coupled to a tub, a handle at the distal end of the wheelbarrow, a wheel mount at the proximal end of the wheelbarrow, a wheel rotatably coupled to the wheel mount, and a wheel comprising non-pneumatic tire with a mounting region and an expanded region, with the width of the expanded region substantially greater than the width of the mounting region.

In one advantageous embodiment of the present invention, the maximum axial width of the expanded region in the axial direction of the tire is constant. Further, the maximum axial width of the mounting region is equal to the maximum axial width of the rim.

The tire can also incorporate transition region between the mounting region and the expanded region in the radial direction of the wheel. The width of the transition region increases as it transitions from the mounting region to the expanded region.

It is another aspect of this invention for the tire to incorporate a tread surface formed at the end of the expanded region, the tread surface being at a constant radial distance from the axis of the wheel.

The tire can also provide a plurality of grooves formed within the tread surface that are separated by a plurality of ribs. The ribs and grooves are non-contiguous, and the rib surfaces are flat.

It is yet another aspect of the present invention for the width of the tread surface to be equal to the width of the expanded region.

Other objects of the invention and its particular features and advantages will become more apparent from consideration of the following drawings and accompanying description.

BRIEF DESCRIPTION OF THE DRAWINGS

FIG. 2 is a side view of the wheel in FIG. 1.

FIG. 3 is a front view of the wheel in FIG. 1.

DETAILED DESCRIPTION OF THE INVENTION

Figure 1:
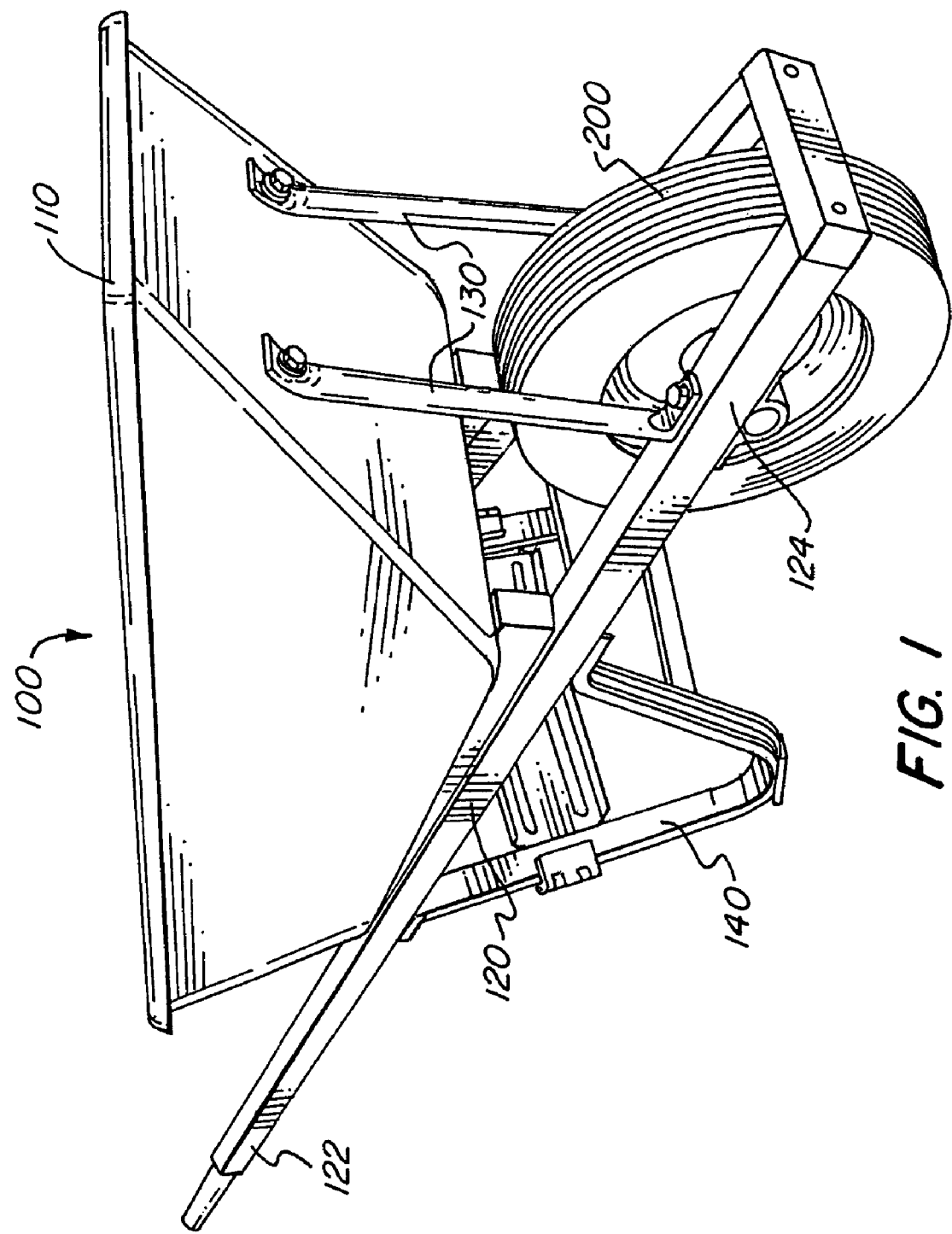
FIG. 1 is a perspective view of a wheelbarrow incorporating a wheel in accordance with the invention.

FIG. 1 shows a wheelbarrow 100 in accordance with the present invention. The wheelbarrow 100 comprises a tub 110 mounted atop rods 120. Rods 120 provide handles 122 at the proximal end of the wheelbarrow and wheel mounts 124 at the distal end. Rods 120 are mounted atop stand 140. Stays 130 couple tub 110 to the forward portion of rods 120 to provide additional support to the forward portion of tub 110. Wheel 200 is rotatably coupled to the forward portion of handles 120.

Figure 4:
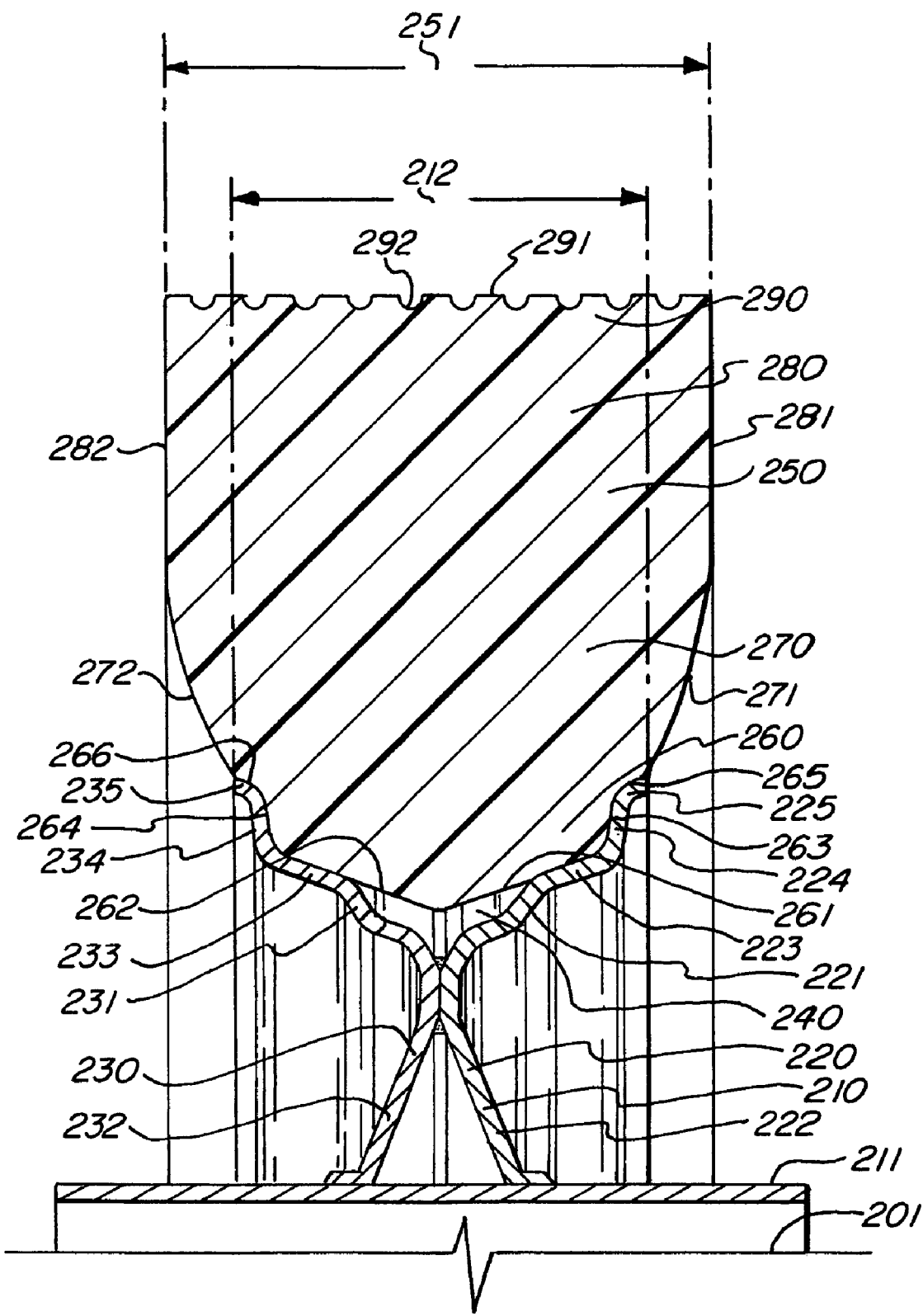
FIG. 4 is a cross-sectional view along the axis of the wheel in FIG. 1.

FIGS. 2-4 display a side view, a forward view, and a cross-sectional view of non-pneumatic wheel 200. Non-pneumatic wheel 200 incorporates a rim 210 and solid tire 230. Non-pneumatic wheel 200 has an axis 201 which is common to both rim 210 and solid tire 230.

Rim 210 comprises a first rim wall 220, a second rim wall 230, and an axle 211. The first 220 and second 230 rim walls each comprise a tire mounting portion 221,231 and an axle coupling portion 222,232. The axle coupling portions 222, 232 couple the rim walls 220,230 to the axle 211. FIG. 2 shows that rim walls 220,230 extend away from axle 211 in a radial direction. Rim walls 220,230 initially converge in the axle coupling portion 222,232 in the radial direction to a minimum separation width. Beyond this width, with increasing radial distance, the axial separation increases in accordance with the tire mounting portions 221,231. The tire mounting portions 221,231 are characterized by an inner tire supporting portion 223,233, a tire retaining portion 224,234, and an outer tire supporting portion 225,235. The elements of the tire mounting portions 221,231 form a mounting cavity 240 and are shaped to correspond to the shape of tire's 250 mounting region 251. The inner supporting portions 223,233, 225,235 are shown to have a slight slope. Thus, the separation of walls 220,230 increases significantly in the axial direction but only slightly in the radial direction. On the other hand, the tire retaining portions 224,234 are shown to have a significant slope. Thus, the separation of walls 220,230 increases slightly in the axial direction but significantly in the radial direction. Inner tire supporting portions 223,233 are shown to have a length greater than the outer tire supporting portions 225,235. The overall width 212 of rim 210 is defined by the maximum radial separation of walls 220,230.

Solid tire 250 incorporates four regions: a mounting region 260, a transition region 270, an expanded region 280, and a tread surface 290. Solid tire 250 is characterized by the fact that there are no gaps, holes, or inclusions within the entire cross-sectional areas of the mounting region 260, the transition region 270, and the expanded region 280.

The mounting region 260 is associated with the portion of the tire 250 that lies within mounting cavity 240 and interacts with rim walls 220,230. The mounting region 260 comprises a first 261 and second 262 mounting surfaces, which extend away from each other in the axial direction. The mounting region 246 also comprises a first mounting sidewall 263 and a second mounting sidewall 264. Mounting region 260 transitions from mounting surfaces 261,262 to mounting sidewalls 263,264 with increasing axial separation. Mounting region 260 also has third 265 and fourth 266 mounting surfaces. Mounting region 260 transitions from mounting sidewalls 263,264 to mounting surfaces 265,266 with increasing axial separation. These surfaces and sidewalls oppose and interface with the mounting portions of rim 210. The shape and counter of mounting region 260 is such that each surface and sidewall corresponds to an opposing supporting and retaining portion. Further, the shape of mounting region 260 is such that it is secured within mounting cavity 240.

The transition region 270 comprises a first transition sidewall 271 and a second transition sidewall 272. Transition region 270 is characterized by an increasing axial width as the region 270 increases in radial distance. Sidewalls 271,272 originate from third and fourth mounting surfaces 265,266 respectively. At this point, transition region 270 has a width equal to mounting region 260. As transition sidewalls 271, 272 move away from these points with increasing radial separation, the separation of the sidewalls 271,272 increases in the axial direction. The axial width of transition region 270 increases until it reaches a maximum width 251. This can represent the furthest radial position of transition region 270.

At the point in which the solid tire 250 reaches its maximum width 251, expanded region 280 is formed. Expanded region 280 comprises a first 281 and second 282 expanded sidewalls. These sidewalls form an expanded region 280 that is of constant width 251. As each sidewall 281,282 extends away in an increasing radial direction from the point of intersection with the transition sidewalls 271,272, the axial separation of each sidewall 281,282 is constant. The separation of each sidewall 281,282 represents the maximum width 251 of tire 250. The expanded region width 251 is shown to be substantially greater than the rim width 212. Expanded sidewalls 281,282 cease at the point of formation tread surface 290.

Tread surface 290 is formed at the end of expanded region 280 and represents the furthest portion of tire 250 in the radial direction from the axis of wheel 200. On a macro scale, tread surface 290 is the outer surface of a cylindrical solid with a constant radial separation from axis 201. Thus, the tread surface 290 presents a relatively flat tread surface as compared with the rounded tread surface typical of prior art wheelbarrow tires. The tread surface 290 is perpendicular to expanded sidewalls 281,282. The width of tread surface 290 can be equal to the width of expanded region 280, thus forming a right angle transition from expanded sidewalls 281,282 to tread surface 290. On a micro scale, tread surface 290 is a summation of ribs 291 and grooves 292 formed in between. Ribs 291 form the portion of the tire 250 that is radially the furthest from axis 201. Ribs 291 form curved surfaces that maintain constant radial separation from axis 201. These rib surfaces 291 are perpendicular to expanded sidewalls 281, 282. Each groove 292 lies between a pair of ribs 291. A groove 292 comprises two surfaces that extend away from the surface of ribs 291 in a decreasing radial direction and intersect. Each rib 291 and groove 292 is non-contiguous with each adjacent rib 291 and groove 292.

There are numerous benefits to the embodiment as described above. First, a tire with a mounting region 260 and an expanded region 280 allow a wheelbarrow to incorporate a light weight non-pneumatic tire. A narrow mounting region 260 relative to the expanded region 280, allows for a narrower rim 210 to be utilized. A narrower rim 210 reduces the weight of the tire. It also enables the wheelbarrow to incorporate the benefits of a wider tire without requiring the rim to be of substantially equal width. This reduces the overall material requirements necessary to form the solid tire and thus reduces its corresponding weight. Reducing the materials necessary to form the overall wheel 200 also reduces its cost. A light weight non-pneumatic tire permits wheelbarrows that are utilized on surfaces such as sandy soils to benefit from the use of a non-pneumatic tire. A non-pneumatic tire with a wider expanded region 280 also provides the wheelbarrow with greater stability. If the wheelbarrow contains a shifting load or even a light load, the stability of the wheelbarrow will be assisted during transportation of the load because of the increased tread surface area 290 and the relative flatness of that surface area. This combined with the fact that the tire is non-pneumatic, also provides the operator with a tire that is more likely to maintain a constant tread surface that interacts with the underlying soil. This provides a wheelbarrow whose stability is less likely to fluctuate with loads of different sizes and centers of gravity. The stability of a wheelbarrow is further enhanced by incorporating a rib design on the tread surface 290. The presence of flat ribs 291 improves the surface area that is in contact with the underlying terrain helping to prevent the wheelbarrow from undergoing lateral shifting. The presence of parallel, non-contiguous grooves 292 is beneficial because they deter debris from being collected between the grooves 292. By utilizing parallel grooves, any debris that is caught in between can be more readily removed.

In the preferred embodiment, solid tire 250 is fabricated from polyurethane. However, solid tire 250 could also benefit from the use of plastic or rubber materials with varying characteristics as to weight, durability, or resiliency.

Although the invention has been described with reference to a particular arrangement of parts, features, and the like, these are not intended to exhaust all possible arrangements or features, and indeed many modifications and variations will be ascertainable to those of skill in the art.

What is claimed is:

1. A wheelbarrow comprising:

a stand coupled to a tub, a handle at the distal end of the wheelbarrow, and a wheel mount at the proximal end of the wheelbarrow; and a wheel rotatably coupled to the wheel mount;

the wheel comprising a rim having an axial width and a non-pneumatic tire surrounding the rim in the radial direction of the wheel, wherein the tire comprises a mounting region and an expanded region, wherein the radial spacing of the expanded region is greater than the radial spacing of the mounting region, wherein the axial width of the expanded region is substantially greater than the axial width of the mounting region, the expanded region having sidewalls and a tread surface having an axial width, the sidewalls being substantially perpendicular to the tread surface, and the tread surface axial width being substantially greater than the rim axial width, and the tread surface having a substantially constant radial distance from the axis of the wheel to stabilize the wheelbarrow.

2. The wheelbarrow of claim 1, wherein the maximum axial width of the expanded region in the axial direction of the tire is constant.

3. The wheelbarrow of claim 2, wherein the maximum axial width of the mounting region is equal to the maximum axial width of the rim.

4. The wheelbarrow of claim 3, wherein the tire further comprises a transition region between the mounting region and the expanded region in the radial direction of the wheel.

5. The wheelbarrow of claim 4, wherein the transition region is of increasing axial width as it transitions from the mounting region to the expanded region in an increasing radial direction.

6. The wheelbarrow of claim 5, wherein a plurality of grooves are formed within the tread surface and are separated by a plurality of ribs.

7. The wheelbarrow of claim 6, wherein the plurality of grooves are noncontiguous and the plurality of ribs are noncontiguous.

8. The wheelbarrow of claim 7, wherein the plurality of ribs comprises surfaces that maintain a substantially constant radial distance from the axis of the wheel.

9. The wheelbarrow of claim 8, wherein the surfaces of the plurality of ribs are at a substantially constant radial distance from the axis of the wheel over the entire axial spacing of the grooves.

10. The wheelbarrow of claim 9, wherein the width of the tread surface in the axial direction is equal to the width of the expanded region in the axial direction.

11. The wheelbarrow of claim 10, wherein the tire is made of a solid material.

12. A wheelbarrow comprising:

a stand coupled to a tub, a handle at the distal end of the wheelbarrow, and a wheel mount at the proximal end of the wheelbarrow; and a wheel rotatably coupled to the wheel mount;

the wheel comprising a rim having an axial width, and a non-pneumatic tire surrounding the rim in the radial direction of the wheel, wherein the tire has sidewalls and a tread surface having an axial width, the sidewalls being substantially perpendicular to the tread surface, the tread surface axial width being substantially greater than the rim axial width, and the tread surface having a substantially constant radial distance from the axis of the wheel to stabilize the wheelbarrow.

13. The wheelbarrow of claim 12, wherein the maximum axial width of the tire is equal to the axial width of the tread surface.

14. The wheelbarrow of claim 13, wherein a plurality of grooves are formed within the tread surface and are separated by a plurality of ribs.

15. The wheelbarrow of claim 14, wherein the plurality of ribs comprises surfaces that are a substantially constant radial distance from the axis of the wheel over the entire axial spacing of the grooves.

16. The wheelbarrow of claim 15, wherein the tread surface is formed in an expanded region.

17. The wheelbarrow of claim 16, wherein the axial width of the expanded region is constant.

18. The wheelbarrow of claim 17, wherein the axial width of the expanded region is equal to the axial width of the tread surface.

19. The wheelbarrow of claim 18, wherein the tire further comprises a transition region; wherein the expanded region lies at a radial distance from the axis of the wheel greater than the transition region; wherein the transition region increases in axial width with increasing radial distance from the axis of the wheel.

* * * * *